United States Patent
Kalkunte et al.

(10) Patent No.: US 6,747,951 B1
(45) Date of Patent: Jun. 8, 2004

(54) METHOD AND APPARATUS FOR PROVIDING EFFICIENT MANAGEMENT OF RESOURCES IN A MULTI-PROTOCOL OVER ATM (MPOA)

(75) Inventors: Mohan V. Kalkunte, Sunnyvale, CA (US); James L. Mangin, San Ramon, CA (US); Derek H. Pitcher, Los Altos, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/399,548

(22) Filed: Sep. 20, 1999

(51) Int. Cl.$^7$ ................................................. H04L 12/28
(52) U.S. Cl. .................... 370/235; 370/351; 370/395.5; 370/401
(58) Field of Search ................................. 370/229, 235, 370/351, 389, 395.1, 396, 397, 395.2, 395.21, 395.3, 395.31, 395.32, 395.4, 395.5, 395.51, 395.54, 400, 401, 409, 410, 433

(56) References Cited

U.S. PATENT DOCUMENTS

| | | | | |
|---|---|---|---|---|
| 4,163,124 A | * | 7/1979 | Jolissaint | 379/266.01 |
| 5,067,123 A | * | 11/1991 | Hyodo et al. | 370/396 |
| 5,448,567 A | * | 9/1995 | Dighe et al. | 370/230.1 |
| 5,450,394 A | * | 9/1995 | Gruber et al. | 370/253 |
| 5,530,695 A | * | 6/1996 | Dighe et al. | 370/232 |
| 5,541,912 A | * | 7/1996 | Choudhury et al. | |
| 5,613,129 A | * | 3/1997 | Walsh | 710/262 |
| 5,764,645 A | * | 6/1998 | Bernet et al. | 370/395.52 |
| 5,854,903 A | * | 12/1998 | Morrison et al. | |
| 6,134,218 A | * | 10/2000 | Holden | 370/232 |
| 6,160,793 A | * | 12/2000 | Ghani et al. | 370/236 |
| 6,172,991 B1 | * | 1/2001 | Mori | 370/389 |
| 6,178,171 B1 | * | 1/2001 | Alexander et al. | 370/395.53 |
| 6,256,314 B1 | * | 7/2001 | Rodrig et al. | 370/401 |
| 6,359,863 B1 | * | 3/2002 | Varma et al. | 370/232 |
| 6,385,170 B1 | * | 5/2002 | Chiu et al. | 370/235 |
| 6,452,921 B1 | * | 9/2002 | Alexander et al. | 370/351 |

FOREIGN PATENT DOCUMENTS

| | | |
|---|---|---|
| EP | 0866630 | 9/1998 |
| WO | WO9918751 | 4/1999 |

OTHER PUBLICATIONS

"Scalability Evaluation of Multi-Protocol Over ATM (MPOA)," New York, NY Mar. 21–25, 1999 IEEE, US, 1505–1512 XP000878268; ISBN: 0–7803–5418–4.

The ATM ForumTechnical Committee; "Multi-Protocol Over ATM Version 1.1"; AF–MPOA–0114.000; pp. 1–231; May 1999; Mountain View, California.

* cited by examiner

Primary Examiner—Huy D. Vu
Assistant Examiner—Daniel Ryman
(74) Attorney, Agent, or Firm—Blakely Sokoloff Taylor & Zafman LLP

(57) ABSTRACT

A technique for dynamically adjusting the aging time of a shortcut virtual circuit connection (VCC) in a Multi-protocol over ATM (MPOA) client based on one or more factors. In one embodiment, a method of dynamically adjusting aging time of a shortcut VCC includes detecting a packet flow between a source and a destination, establishing a shortcut VCC between the source and destination, and adjusting an aging time of the shortcut VCC in response to the number of VCCs available by the MPOA client. In other embodiments, the aging time is dynamically adjusted based on the VCC threshold level, the protocol of the flow, and/or the application type of the flow.

17 Claims, 7 Drawing Sheets

FIG. 5

VCC THRESHOLD TABLE 510

| $L_1$ | $L_2$ | $L_3$ | $L_4$ | ... | $L_N$ |
|---|---|---|---|---|---|
| $\frac{X}{N}$ | $\frac{2*X}{N}$ | $\frac{3*X}{N}$ | $\frac{4*X}{N}$ | ... | $X$ |

AGING TIME TABLES 520

$525_1$: $A[L_1], P_1$ | $A[L_2], P_1$ | $A[L_3], P_1$ | $A[L_4], P_1$ | ... | $A[L_N], P_1$

⋮

$525_y$: $A[L_1], P_y$ | $A[L_2], P_y$ | $A[L_3], P_y$ | $A[L_4], P_y$ | ... | $A[L_N], P_y$ $530_1$: $A[L_1], APP_1$ | $A[L_2], APP_1$ | $A[L_3], APP_1$ | $A[L_4], APP_1$ | ... | $A[L_N], APP_1$

⋮

$530_z$: $A[L_1], APP_z$ | $A[L_2], APP_z$ | $A[L_3], APP_z$ | $A[L_4], APP_z$ | ... | $A[L_N], APP_z$

METHOD AND APPARATUS FOR PROVIDING EFFICIENT MANAGEMENT OF RESOURCES IN A MULTI-PROTOCOL OVER ATM (MPOA)

BACKGROUND OF THE INVENTION

1. Field of the Invention

The present invention relates generally to the field of computer networks, and specifically, to efficient management of resources in a Multi-protocol Over ATM (MPOA) environment.

2. Background Information

The Internet has changed the way people communicate, do business, and obtain information. Corporate entities rely heavily on Internet access and usage for transmitting and receiving electronic mail, providing information to consumers on-line, selling products/services, and the like. A large number of these entities are interconnected with legacy local area networks (LANs) that implement a number of protocols (e.g., Ethernet). Today, Asynchronous Transfer Mode (ATM) networks have emerged as the technology of choice for wide area networks such as the Internet, especially for different types of traffic including voice, data, multimedia, etc. Many new corporate entities have also switched to ATM networks. However, for existing corporate entities that have legacy LANs, it is expensive to transition to ATM networks.

As a result, the ATM Technical Committee has introduced and published a standard entitled Multi-Protocol Over ATM (MPOA) specification, Multi-Protocol Over ATM Version 1.1, AF-MPOA-0114.000, published May 1999 (hereinafter referred to as "MPOA," "the MPOA protocol," or "the MPOA specification"), the contents of which is fully incorporated herein by reference. MPOA allows entities to take advantage of the bandwidth and scalability of ATM using the legacy LANs. Thus, MPOA allows LANs on different sub-networks to communicate via ATM networks. Although MPOA provides numerous advantages not previously realized, it can be further optimized.

SUMMARY OF THE INVENTION

The present invention is directed to a method and apparatus for dynamically adjusting the aging time of a shortcut virtual circuit connection (VCC) in a Multi-protocol over ATM (MPOA) client. In one embodiment, a method detects a packet flow between a source and a destination, and establishes a shortcut VCC between the source and destination. The aging time of the shortcut VCC is dynamically adjusted in response to one or more of the following factors: the number of VCCs available by the MPOA client, the application type of the packet flow, and the protocol type of the flow. Consequently, the aging time is adjusted to tailor to the current state of the system and the type of flow.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 5 shows a VCC threshold table and aging timer tables, according to one embodiment of the present invention.

DETAILED DESCRIPTION

The present invention comprises a method and apparatus for dynamically adjusting the aging time of a shortcut virtual circuit connection (VCC) in a Multi-protocol over ATM (MPOA) client. In one embodiment, a method includes detecting a packet flow between a source and a destination, establishing a shortcut VCC between the source and destination, and adjusting an aging time of the shortcut VCC in response to the number of VCCs available by the MPOA client. In other embodiments, the aging time is dynamically adjusted based on the VCC threshold level, the protocol of the flow, the application type of the flow, etc.

Figure 1:
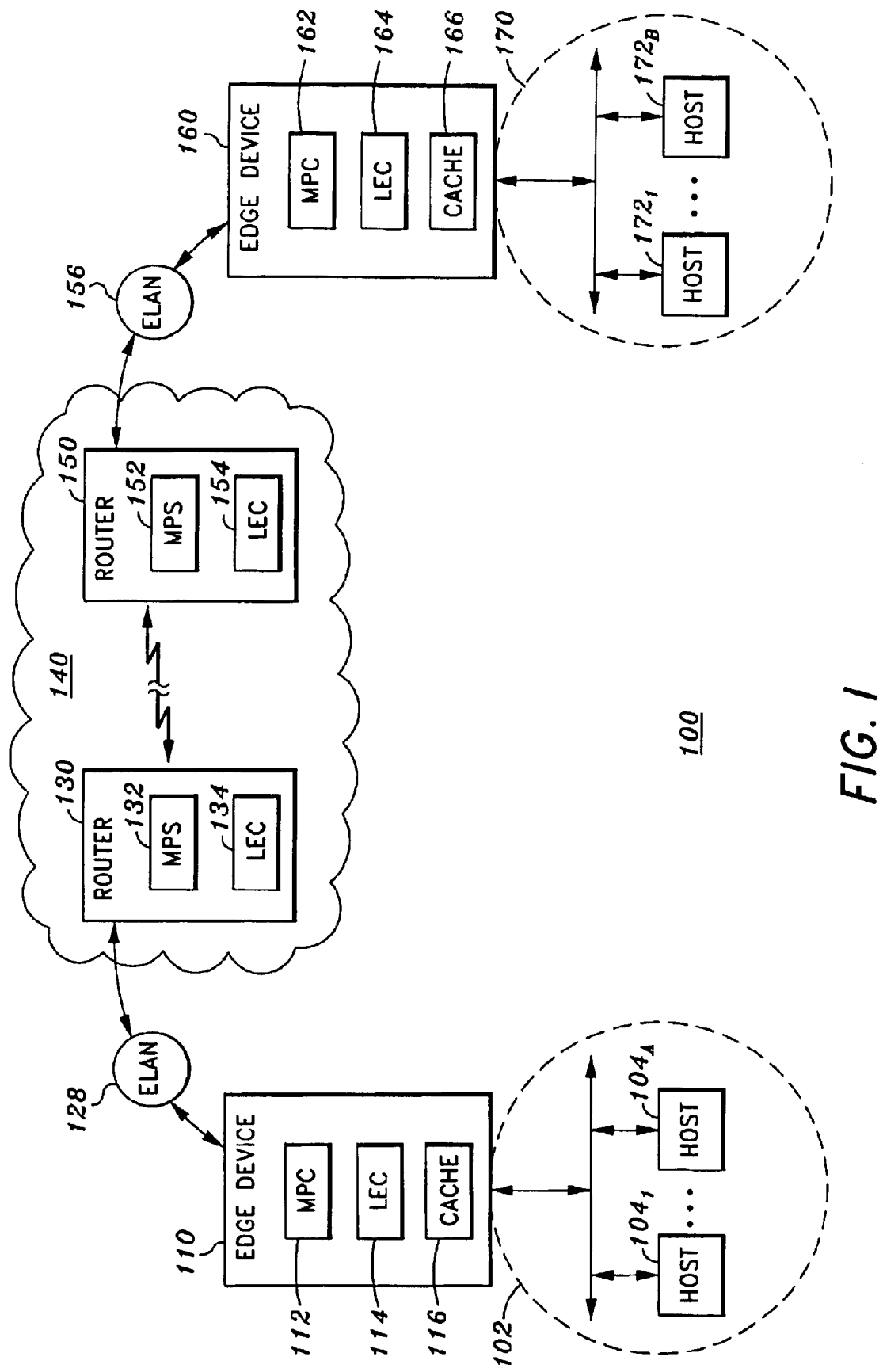
FIG. 1 illustrates a multi-protocol over ATM system for implementing embodiments of the present invention.

FIG. 1 illustrates a multi-protocol over ATM (MPOA) system 100 for implementing embodiments of the present invention. Referring to FIG. 1, the MPOA system 100 includes edge devices 110 and 160, e.g., network devices, such as LAN-to-ATM switches or other MPOA devices, that are directly connected to LANs or LAN segments 102 and 170, respectively, and ATM cloud 140. LANs 102 and 170 each include a number of hosts $104_1$–$104_A$ (104) and $172_1$–$172_B$ (172), respectively, where "A" and "B" are positive whole numbers. Moreover, LANs 102 and 170 may be connected in any topology (e.g., linear bus, star, etc.), and may run any protocol (e.g., Ethernet, token ring, fiber distributed data interface "FDDI", etc.).

The MPOA system 100 of the present example also includes one or more intermediate network devices, such as routers 130 and 150, coupled between edge devices 110 and 160. It is appreciated that additional intermediate network devices, such as ATM switches and routers, may be located on the data path between routers 130 and 150.

Edge devices 110 and 160 include LAN emulation clients (LECs) 114 and 164, respectively, and MPOA clients (MPCs) 112 and 162, respectively. LECs perform forwarding in accordance with the ATM Forum's LAN Emulation Over ATM (LANE) specification, Version 1.0, AF-LANE-0021.000, published January 1995. Typically, network devices have a LEC for each emulated LAN (ELAN) interface.

MPCs are MPOA protocol entities that implement the client side of the MPOA protocol. MPCs typically operate in one of two roles, namely, as an ingress MPC and an egress MPC. In its ingress role, the MPC performs such functions as forwarding of packets over an ELAN to a router, flow threshold detection, shortcut resolution request and reply processing, establishing shortcuts, and forwarding packets over the shortcut. In its egress role, the MPC performs such functions as forwarding packets received over a path to its local interface, cache imposition request and reply processing, adding DLL encapsulation to packets received over the shortcut, all of which are described in the following paragraphs.

Routers 130 and 150 each include MPOA protocol entities that implement the server side of the MPOA protocol, namely, MPOA server (MPS) 132 and 152, respectively. For example, the MPSs are responsible for maintaining and distributing knowledge of the topology of the network. Additionally, router 130 includes LEC 134 for ELAN interface 128 and router 150 includes LEC 154 for ELAN interface 156. In one embodiment, the cloud 140 may be an ELAN, a Logical IP Subnetwork (LIP), or other communication systems.

For purposes of this example, edge device 110 is assumed to be the point at which a flow enters the MPOA system 100 and edge device 160 is the point at which the flow exits the MPOA system 100. As described herein a "flow" is defined as a stream of data originating from a single source and directed to a single destination. For example, host 104 coupled to a LAN port (not shown) of edge device 110 may be transmitting packets to host 172 coupled to a LAN port (not shown) of edge device 160. Further, this example assumes that hosts 104 and 172 are on different subnets. Therefore, MPC 112 operates in its role as an Ingress MPC (I-MPC), MPS 132 operates in its role as an Ingress MPS (I-MPS), MPS 152 operates in its role as an Egress MPS (E-MPS), and MPC 162 operates in its role as an Egress MPC (E-MPC).

An Ingress Cache (I-Cache) 116 is maintained by MPC 112 for purposes of detecting inbound flows and keeping track of the shortcut VCC and encapsulation information (e.g., the LLC header to prepend to a packet before sending it on the shortcut) for those flows. Typically, an inbound flow is determined to exist once the MPC counts a predetermined number of packets addressed to a specific host within a predetermined time interval. In this example, the MPC 112 performs flow threshold detection by creating I-Cache entries and keeping packet counts for each MPS/IP address pair.

An Egress Cache (E-Cache) 166 is maintained by MPC 162 to facilitate handling of packets received over shortcuts that are to be forwarded on an outbound LAN port. E-Cache entries include, among other things, encapsulation information (e.g., the outbound DLL header to prepend to the packet before sending it to the outbound port). Encapsulation information is entered into the E-Cache 166 at the direction of the E-MPS 152 by way of a Cache Imposition Request protocol data unit (PDU).

While for purposes of explanation, MPOA protocol entities are depicted as residing on separate devices, it is appreciated that two or more MPOA protocol entities may be co-located. A LAN-LAN flow, for example, may involve two MPCs that reside on the same edge device, one serving as the Ingress MPC and the other as the Egress MPC. Additionally, a single MPOA protocol entity may assume the role of both an ingress and an egress for a particular transmission path. For instance, edge devices 110 and 160 might be separated by only a single router 130 or 150, in which case, the MPS 132 or 152 would perform both ingress and egress MPS functions for data packets sourced at host 104 and destined for host 172. Moreover, the ingress functions of the edge device 110 and router 130 may be combined into a single ingress device that includes both the I-MPC 112 and the I-MPS 132. Similarly, the egress functions of the router 150 and edge device 160 may be combined into a single egress device that includes both the E-MPS 152 and the E-MPC 162. Further, it is important to note that MPOA protocol entities are logical rather than physical entities and therefore may span one or more physical devices.

Initially, the I-Cache 116 and E-Cache 166 have no entries. Upon receiving a first packet at edge device 110 that is destined for host 172 (i.e., a packet containing the internetwork address of host 172 and the MAC address of router 130), an entry is created in the I-Cache 116 and a packet count for this path is initialized to 1. The exemplary fields in the I-Cache 116 include an MPS address, an IP address, VCC, packet count, encapsulation information, etc. The first packet destined for host 172 is forwarded via normal LANE procedures through LEC 114 over the default path (i.e., the hop-by-hop path from router 130 to router 150 as determined by routing protocols). Subsequent data packets destined for host 172 cause the packet count associated with the MAC/internetwork address pair to be incremented. That is, each packet being sent to an MPS is tallied by its destination internetwork address. These subsequent packets continue to be forwarded over the default path until an inbound flow is detected. A "flow" is said to be detected when the number of packets to a destination within a predetermined time interval exceeds a threshold value. After an inbound flow is detected, the I-MPC 112 seeks to establish a shortcut to the E-MPC 162 serving IP destination 172.

Figure 2:
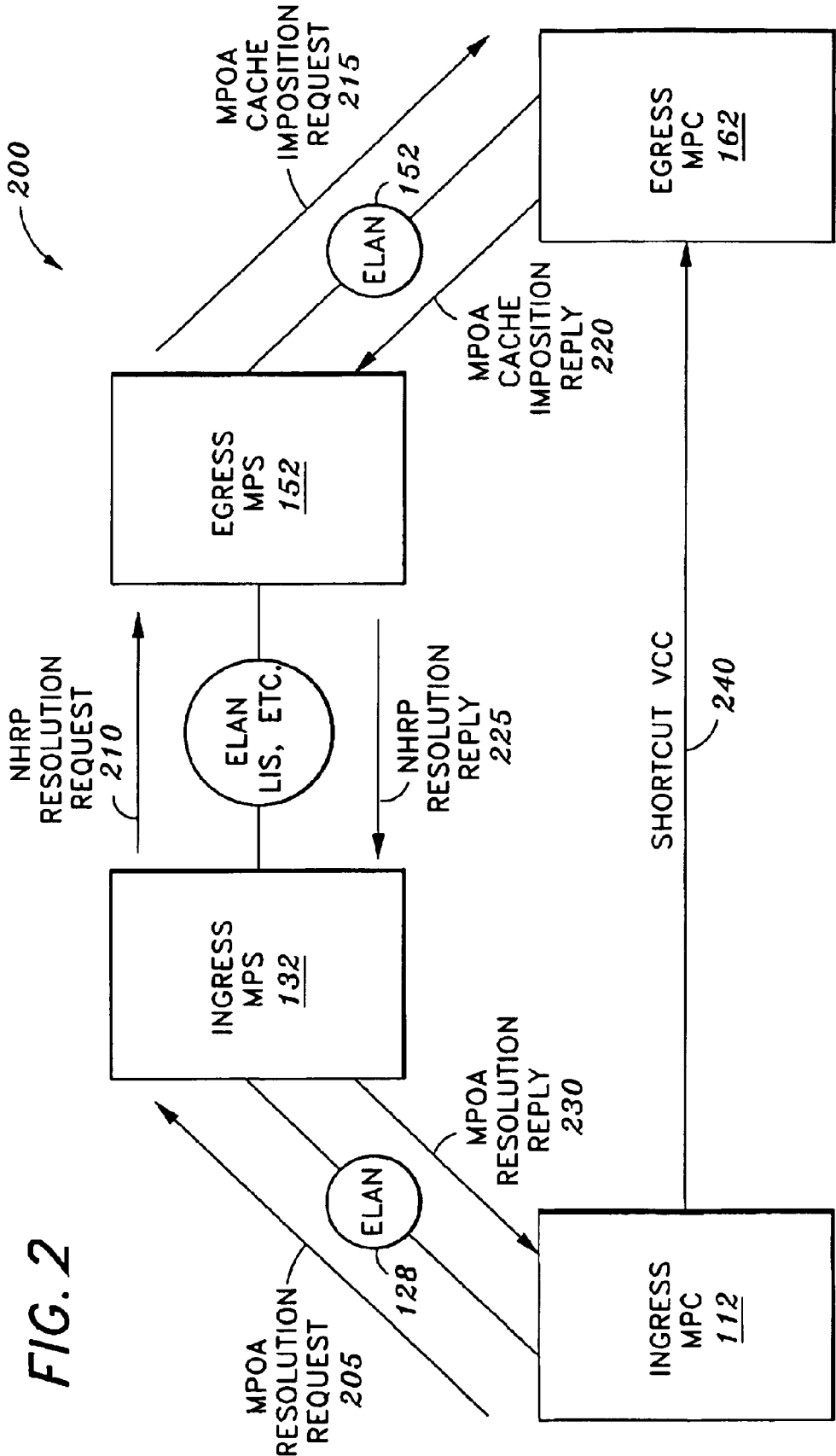
FIG. 2 illustrates a logical diagram of the MPOA resolution process for establishing shortcuts directly across an ATM network.

FIG. 2 illustrates a logical diagram of the MPOA resolution process 200 for establishing shortcuts directly across an ATM network. The technique of establishing shortcuts directly across an ATM network involves the exchange of information in the form of MPOA requests and replies between MPCs and MPSs. MPSs communicate with each other via the Next Hop Resolution Protocol (NHRP) and convert between MPOA requests and replies and NHRP requests and replies on behalf of the MPCs.

Referring to FIG. 2, in order to establish a shortcut virtual circuit connection (VCC) 240 from the I-MPC 112 to the E-MPC 162, the I-MPC 112 must determine the IP address of the destination, i.e., E-MPC 162. To that end, the I-MPC 112 sends/ transmits an MPOA resolution request 205 to the I-MPS 132. The I-MPS 132 translates the MPOA resolution request 205 to an NHRP resolution request 210 and forwards the same on the routed path until it reaches the E-MPS 152. The E-MPS 152 translates the NHRP resolution request 210 to an MPOA cache imposition request 215 and forwards the same to the E-MPC 162. The E-MPC 162 responds with an MPOA cache imposition reply 220 (and creates an entry in its cache). The E-MPC 152 translates the reply 220 to a NHRP resolution reply 225 and forwards the same until it reaches the I-MPC 132. The I-MPC 130 translates the Reply 225 to an MPOA resolution reply 230 and forwards the same to the I-MPC 112.

The exchange of the Request/ Reply PDUs 205 and 230 adds the appropriate shortcut encapsulation information for the detected flow to the I-Cache 116. In addition, the exchange of Cache Imposition Request/Reply PDUs 215 and 220 between E-MPS 152 and E-MPC 162 adds the corresponding outbound encapsulation information to the E-Cache 166. When shortcut resolution is successful, corresponding entries containing necessary shortcut information are stored in the I-Cache 116 and E-Cache 166 for the flow. After an inbound flow has been detected and a shortcut has been resolved, the shortcut VCC 240 is established between the edge devices 110 and 160. Thereafter, subsequent packets destined for host 172 are sent over the shortcut 240, which reduces latency by avoiding hop-by-hop processing by the routers of ATM cloud 140 (FIG. 1).

Figure 3:
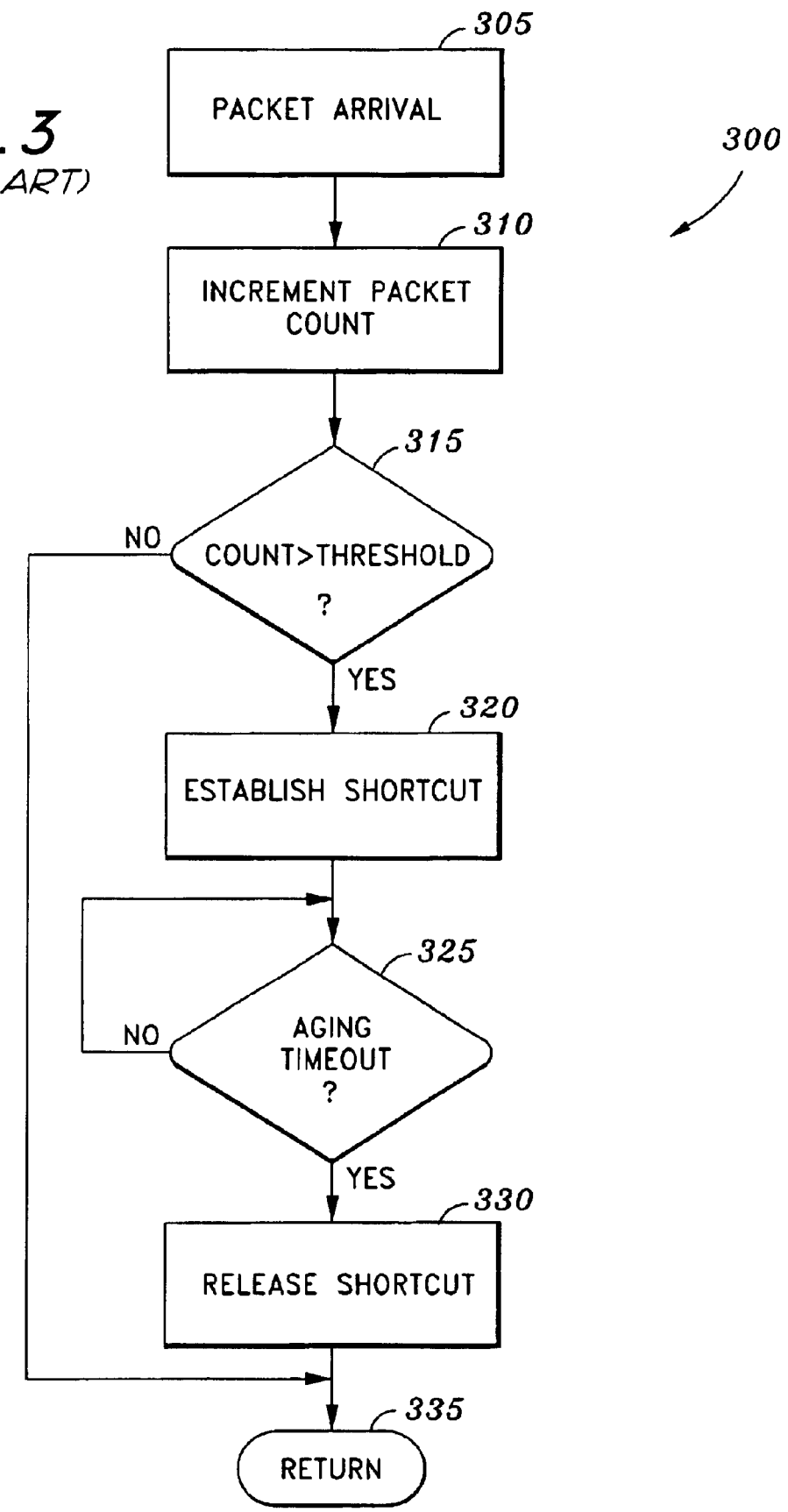
FIG. 3 shows a logical flow diagram of a conventional method for establishing and releasing a shortcut VCC.

FIG. 3 shows a logical flow diagram of a conventional method 300 for establishing and releasing a shortcut VCC. Referring to FIG. 3, the method 300 commences at block 305 where a packet arrives. When a packet arrives, the contents of the packet header are examined, and at block 310, a packet count is incremented. At block 315, a determination is made as to whether the packet count is greater than (or equal to) a predetermined threshold count per unit time. That is, if the packet count per unit time is greater than the predetermined threshold count, then the method continues to block 320 for establishing a shortcut VCC, otherwise, the method ends at block 335. At block 320, a shortcut VCC is established as shown in FIG. 2, and an aging timer is set. Once the shortcut VCC is established, the method moves to block 325 where it is determined whether there is an aging timeout. An aging timeout occurs when there is no packet arrival for the flow for a predetermined amount of time. If there is inactivity for the predetermined time, then the method moves to block 330 where the shortcut VCC is released. The process then ends at block 335. The method 300 is repeated for subsequent packets received.

To increase the efficiency of MPOA, the present invention provides a technique that efficiently manages the use of shortcut VCCs once they are set up. That is, once a shortcut VCC is set up using the normal MPOA protocol and handshaking, the technique of the present invention dynamically adjusts the aging time of shortcut VCCs depending on a number of factors. These factors include, but are not limited or restricted to, VCC threshold levels, protocol type, application type, and combinations thereof. The aging time is defined as the time during which there is no activity for a particular flow.

Figure 4:
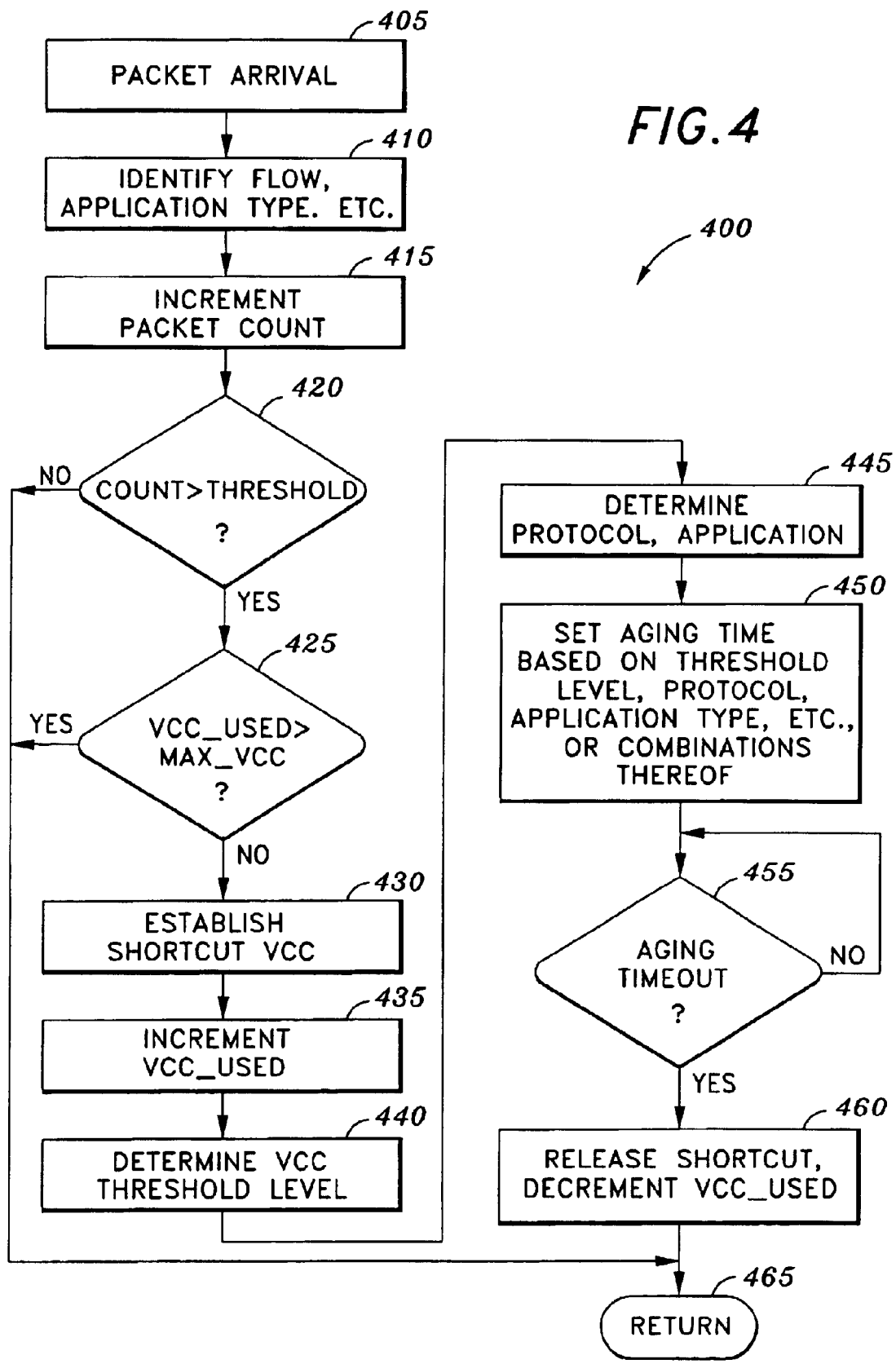
FIG. 4 illustrates a logical flow diagram of a method for establishing a shortcut VCC and dynamically setting the aging time, according to one embodiment of the present invention.

FIG. 4 illustrates a logical flow diagram of a method 400 for establishing a shortcut VCC and dynamically setting the aging time, according to one embodiment of the present invention. More specifically, the present invention dynamically adjusts the aging time based on a number of factors including, for example, resources and flow parameters. In one embodiment, resources include the number of available VCCs, number of flows established, memory, etc., and the flow parameters include application type, protocol type, etc. This allows the aging time to be based on the current state of the system, thereby maximizing efficiency of the system. It is to be appreciated that any one or combination of factors may be utilized in adjusting the aging time. In the exemplary embodiment of FIG. 4, the aging time is adjusted based on one or more of the VCC threshold level, protocol type, and application type. In one embodiment, the method 400 of the present invention is implemented as part of the MPC 112 of edge device 110 (FIG. 1).

Referring to FIG. 4, the method 400 commences at block 405 where a packet is received. At block 410, the flow, protocol type, and application type of the packet are identified. If a shortcut has been established, the packet is forwarded via the shortcut VCC. However, if a shortcut is not established, the packet is forwarded via the default path (e.g., via ELAN). The packet count is also incremented (block 415). At block 420, if the packet count, per predetermined unit of time, exceeds a predetermined threshold, the process 400 moves to block 425, otherwise the process ends at block 465.

At block 425, a determination is made as to whether the number of VCCs used (VCC_USED) is greater than a predetermined maximum VCC value (MAX_VCC). Typically, the number of VCCs available at a network device (e.g., such as edge device 110) is limited. For example, edge device 110 may be constrained to having 100 VCCs established at any one time. Consequently, if VCC_USED is greater than (or equal to) MAX_VCC, then a shortcut VCC cannot be established and the process 400 ends at block 465.

On the other hand, if VCC_USED is not greater than MAX_VCC, then the process continues to block 430 where a shortcut VCC is established according to the MPOA protocol. At block 435, the parameter VCC_USED is incremented, and at block 440 the VCC threshold level is determined. The VCC threshold level indicates the state of the resources available. It is to be appreciated that the number of threshold levels and granularity may be set at any value.

FIG. 5 shows a VCC threshold table 510 and aging timer tables 520, according to one embodiment of the present invention. Referring to FIGS. 4 and 5, the table 510 includes a plurality of entries, L1–LN, corresponding to the number of threshold levels. The VCC threshold is X. For example, if there are 100 VCCs available for establishing shortcuts, then X may be set to 100 or some other value less than 100. Assuming X is 100 and the number of threshold levels N, is 5, then for 0–20 VCCs used, the threshold level is L1, for 21–40 VCCs used, the threshold level is L2, for 41–60 VCCs used, the threshold level is L3, for 61–80 VCCs used, the threshold level is L4, and for 81–100 VCCs used, the threshold level is L5. In one embodiment, the higher the threshold level (i.e., the number of VCCs used), the lower the aging time that is set for a particular shortcut VCC. A higher or lower granularity may be used depending on system requirements and the particular application.

Continuing to refer to FIG. 4, at block 445, the protocol and application of the packet is determined. The protocol and application types are determined by examining the header of the packet and identifying the port number that the packet was received on. Protocols include IP over ATM, IPX over ATM, Appletalk, etc. Applications include HTTP web pages, FTP, email, video conferencing, etc. At block 450, the aging time is adjusted on the threshold level, protocol type, application type, etc. or any combination thereof.

Referring again to FIG. 5, the aging time tables 520 provide the different aging time values to be used depending on the protocol or application type. Table 525₁ provides the aging times based on the VCC threshold level and a first protocol (P1) such as IP, whereas table 525Y provides the aging times based on the VCC threshold level and an Yth protocol (PY) such as Appletalk. Correspondingly, table 530₁ provides the aging times based on the VCC threshold level and a first application (APP1) such as HTTP, whereas table 530Z provides the aging times based on the VCC threshold level and a Zth application (APPZ) such as email. Different aging tables may be provided based on various combinations such as an aging table based only on the VCC threshold level or an aging table based on the combination of the protocol and application types.

Referring back to FIG. 4, at block 455, once the aging time is set, a determination is made as to whether there is an aging timeout. If so, the process moves to block 460 where the shortcut is released, and the parameter VCC_USED is decremented.

By having different aging times based on the VCC threshold, the VCCs are held for a time dependent on the current state of the system, namely, number of VCCs used. Additionally, by distinguishing flows based on the protocol/application type, additional granularity is provided in aging time since not all protocols/applications behave alike. For example, certain protocols such as HTTP have a short session time during which a burst of packets arrives in a short period of time followed by periods of inactivity. In such an instance, the aging time may be adjusted lower compared to a telnet session between a client and a server.

Figure 6:
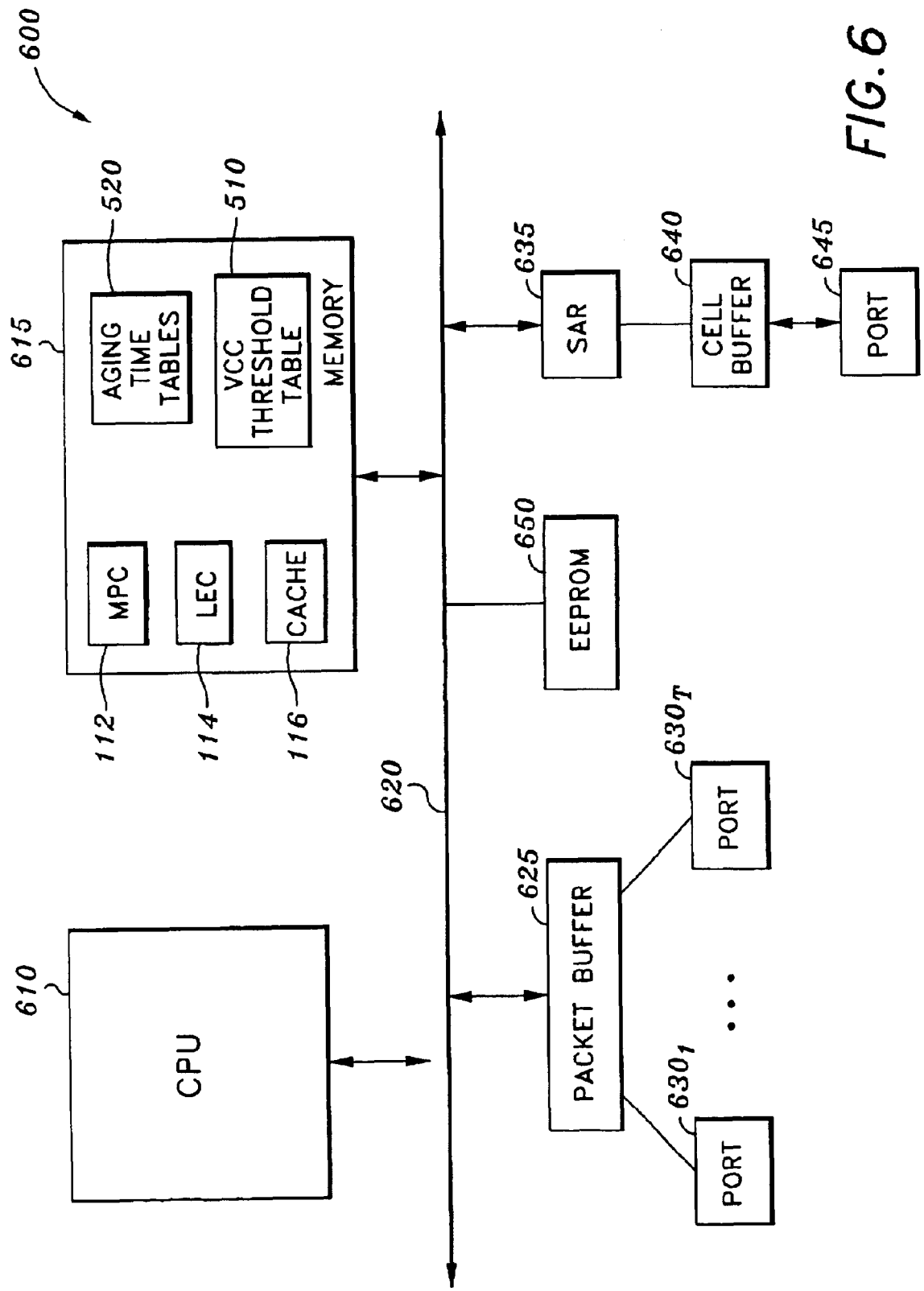
FIG. 6 illustrates an exemplary block diagram of an edge device, according to one embodiment of the present invention.

FIG. 6 illustrates an exemplary block diagram of an edge device 600, such as edge device 110 of FIG. 1, according to one embodiment of the present invention. Referring to FIG. 6, edge device 600 includes a central processing unit (CPU) 610 and a memory 615, which are coupled to a system bus 620. In one embodiment, the CPU is a microprocessor, microcontroller, an application specific integrated circuit (ASIC), an FPGA, etc., while memory 615 may include one or more random access memory devices. The memory 615 contains the MPC module 112, the LEC module 114, cache 116, and the threshold VCC and aging timer tables 510 and 520. In one embodiment, the MPC 112, LEC 114, and tables 510 and 520 are loaded into memory 615 during power-on reset from a non-volatile device 650 such as an EEPROM, flash, etc.

Edge device 600 includes a packet buffer 625 that is coupled to the bus 620 and a number of ports $630_1$–$630_T$ that are coupled to the packet buffer 625. Moreover, edge device 600 includes a segmentation and reassembly circuit (SAR) 635 that is coupled to the bus 620, and a cell buffer 640 connected between the SAR 635 and a port 645. Both incoming and outgoing packets may be temporarily stored in the cell buffer 640.

If a packet received from an external source is to be transmitted through the port 645, then the SAR circuit 635 encapsulates the data from the packet into ATM cells. For transmission of packets over one or more ports $630_1$–$630_T$, the appropriate information from the cells must be extracted, and the packets must be encapsulated.

In the illustrated embodiment, address resolution processing and flow threshold detection processing is performed by CPU 610 and memory 615. Importantly, in alternative embodiments, the CPU 610 and memory 615 may be implemented in any programmable or hardcoded logic, such as an FPGA, TTL logic, or an ASIC.

Figure 7:
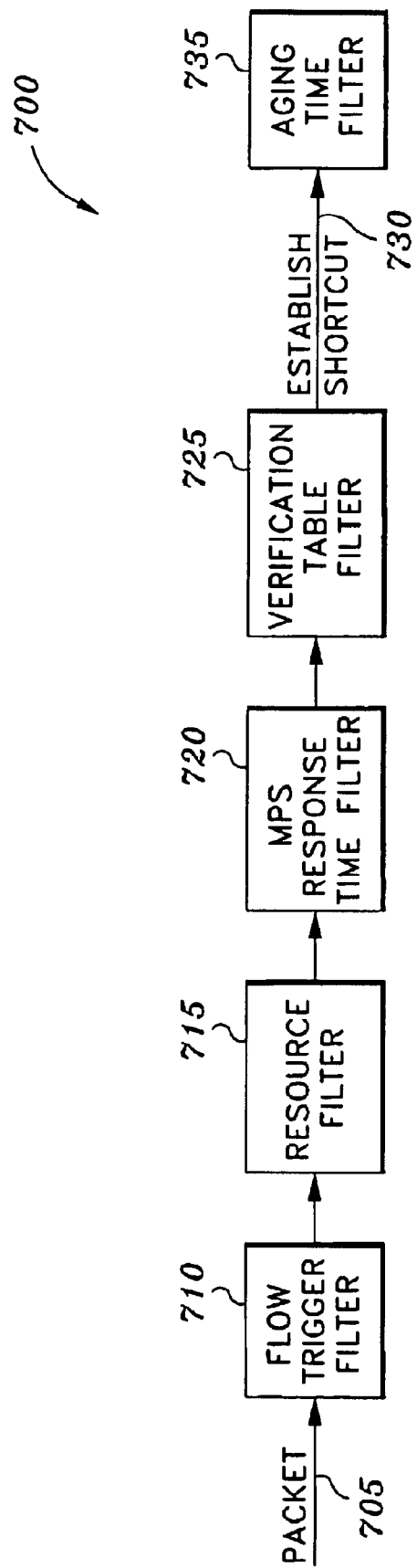
FIG. 7 illustrates a block diagram of the aging time filter of the present invention combined with several other filters to efficiently manage resources in an MPOA environment.

The present invention may be combined with one or more additional filters to provide efficient management of resources. FIG. 7 illustrates a block diagram 700 of the aging time filer of the present invention combined with several other filters to efficiently manage resources in an MPOA environment. In one embodiment, the block diagram 700 is performed by MPC 112 or MPC 162 of FIG. 1.

Referring to FIG. 7, the block diagram 700 shows a flow trigger filter 710, a resource filter 715, a MPS response time filter 720, a verification table filter 725, and the aging time filter 735 of the present invention. The flow trigger filter 710, as described above, determines whether a predetermined number of packets are received within a predetermined amount of time. The resource filter 715, which is also described above, determines whether there are sufficient resources to establish a shortcut such as available VCCs, memory, etc. The MPS response time filter 720 is used to determine whether to establish a shortcut VCC based on an expected MPOA server response time. The MPS response time filter 720 is described in co-pending U.S. patent application Ser. No. 09/257,075, entitled Establishing Shortcuts in a Mutiprotocol-over-ATM System, filed Feb. 24, 1999 and assigned to the assignee of the present invention, the contents of which are incorporated herein by reference. The verification table filter 725 is used to determine whether to establish a shortcut VCC using a verification table. The verification table filter 725 is described in U.S. Pat. No. 6,279,035, entitled Optimizing Flow Detection and Reducing Control Plane Processing in a Multi-Protocol Over ATM (MPOA) System, filed Apr. 10, 1998 and assigned to the assignee of the present invention, the contents of which are incorporated herein by reference.

It is to be appreciated that one or more of the filters 710, 715, 720, and 725 may be used in order to determine whether to establish a shortcut VCC. Additionally, the order of applying filters 710, 715, 720, and 725 is not restricted to that shown and may vary as desired.

Once one or more filters 710, 715, 720, and 725 have been satisfied, a shortcut VCC is established as shown by numeral 730. The aging time of the shortcut VCC is then dynamically set by the aging time filter 735, as described in embodiments of the present invention.

Thus, the present invention may be embodied in one of several forms including a method, an apparatus, and a program product that includes a computer readable medium having embodiment therein computer readable program for dynamically adjusting the aging time of a shortcut VCC. Examples of the computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. In a multiprotocol over ATM (MPOA) client, a method of dynamically adjusting aging time of a shortcut virtual circuit connection (VCC), comprising:

detecting a packet flow between a source and a destination;

establishing a shortcut VCC between the source and destination;

defining a first VCC threshold level as 0 to (X/N)−1 unavailable VCCs, where X is the total number of VCCs that can be assigned by the MPOA client and N is the number of VCC threshold levels;

defining a second VCC threshold level as X/N to ((2*X/N)−1 unavailable VCCS;

defining an Nth VCC threshold level as (((N−1)*X)/N to X−1 unavailable VCCs; and adjusting an aging time for release of the shortcut VCC, the aging time being adjusted in response to a VCC threshold level chosen from one of the N defined VCC threshold levels.

2. The method of claim 1 wherein as the number of VCCs available decreases the aging time for a particular shortcut VCC also decreases.

3. The method of claim 1 wherein adjusting the aging time of the shortcut VCC comprises adjusting the aging time of the shortcut VCC in response to the number of VCCs available by the MPOA client and a protocol of the packet flow.

4. The method of claim 1 wherein adjusting the aging time of the shortcut VCC comprises adjusting the aging time of the shortcut VCC in response to the number of VCCs available by the MPOA client and art application of the packet flow.

5. The method of claim 1 wherein adjusting the aging time of the shortcut VCC comprises adjusting the aging time of the shortcut VCC in response to the number of VCCs available by the MPOA client, and a protocol and an application of the packet flow.

6. An apparatus in a multi-protocol over ATM (MPOA) system, comprising:
 a memory having one or more instructions contained therein; and
 a processor coupled to the memory, the processor configured to respond to the one or more instructions, and thereby to,
  detect a packet flow between a source and a destination,
  establish a shortcut virtual circuit connection (VCC) between the source and destination,
  define a first VCC threshold level as 0 to X/N)−1 unavailable VCCs, where X is the total number of VCCs that can be assigned by the MPOA client and N is the number of VCC threshold levels;
  define a second VCC threshold level as X/N to ((2*X/N)−1 unavailable VCCs;
  define an Nth threshold level is defined as (((N−1)*X)/N to X−1 unavailable VCCs; and
  adjust an aging time for release of the shortcut VCC, the aging time being adjusted in response to a VCC threshold level chosen from one of the N defined VCC threshold levels.

7. The apparatus of claim 6 wherein the processor further responds to the one or more instructions to adjust the aging time of the shortcut VCC in response to the number of VCCs available and a protocol of the packet flow.

8. The apparatus of claim 7 wherein the processor further responds to the one or more instructions to adjust the aging time of the shortcut VCC in response to the number of VCCs available, the protocol of the flow, and an application type of the packet flow.

9. The apparatus of claim 6 wherein the processor further responds to the one or more instructions to decrease the aging time of the shortcut VCC as the number of VCCs available decreases.

10. A program product comprising:
 a computer readable medium having computer program code embodied therein to detect a packet flow between a source and a destination;
 computer readable program code to cause establishment of a shortcut virtual circuit connection (VCC) between the source and destination if a number of VCCs used is below a predetermined maximum VCC value;
 computer readable program code to define a first VCC threshold level as 0 to (X/N)−1 unavailable VCCs, where X is the total number of VCCs that can be assigned by the MPOA client and N is the number of VCC threshold levels;
 computer readable program code to define a second VCC threshold level as X/N to ((2*X)/N)−1 unavailable VCCS;
 computer readable program code to define an Nth threshold level is defined as ((N−1)*X)/N to X−1 unavailable VCCS, and
 computer readable program code to dynamically set an aging time for release of the shortcut VCC, the aging time being adjusted in response to a VCC threshold level chosen from one of the N defined VCC threshold levels.

11. The program product of claim 10 wherein computer readable program code to dynamically set the aging time of the shortcut VCC comprises computer readable program code to dynamically adjust the aging time of the shortcut VCC in response to a protocol of the packet flow and the number of VCCs available.

12. The program product of claim 10 wherein computer readable program code to dynamically set the aging time of the shortcut VCC comprises computer readable program code to dynamically adjust the aging time of the shortcut VCC in response to a protocol of the packet flow, an application of the packet flow, and the number of VCCs available.

13. The program product of claim 10 further comprising computer readable program code to cause the shortcut VCC to be released if the packet flow is inactive for a time equal to the aging time.

14. A multiprotocol over ATM (MPOA) system, comprising:
 a destination device;
 an egress device coupled to the destination device;
 a source device; and
 an ingress device coupled to a source device, and to the egress device through a first network having at least a router, said ingress device to forward packets, originating from the source device, to the egress device through the first network, said ingress device to establish a shortcut virtual circuit connection (VCC) between the ingress and egress devices, and adjust an aging time for release of the shortcut VCC, the aging time being adjusted in response to one of N VCC threshold levels, wherein
  a first VCC threshold level is defined as 0 to (X/N)−1 unavailable VCCs, where X is the total number of VCCs that can be assigned by the MPOA client and N is the number of VCC threshold levels,
  a second VCC threshold level is defined as X/N to ((2*X)/N)−1 unavailable VCCs,
  and an Nth threshold level is defined as (((N−1)*X)/N to X−1 unavailable VCCs.

15. The MPOA system of claim 14 wherein the aging time is adjusted further in response to one or more of the following: a protocol of the packet flow, an application of the packet flow, and a number of VCCs available on the ingress device.

16. The MPOA system of claim 14 wherein said ingress device establishes the shortcut VCC between the ingress and egress devices when a number of packets received from the source device within a predetermined amount of time is greater than a predetermined value.

17. The MPOA system of claim 14 wherein the ingress device is coupled to the source device through a second network and the egress device is coupled to the destination device through a third network.

* * * * *